Patented Nov. 10, 1953

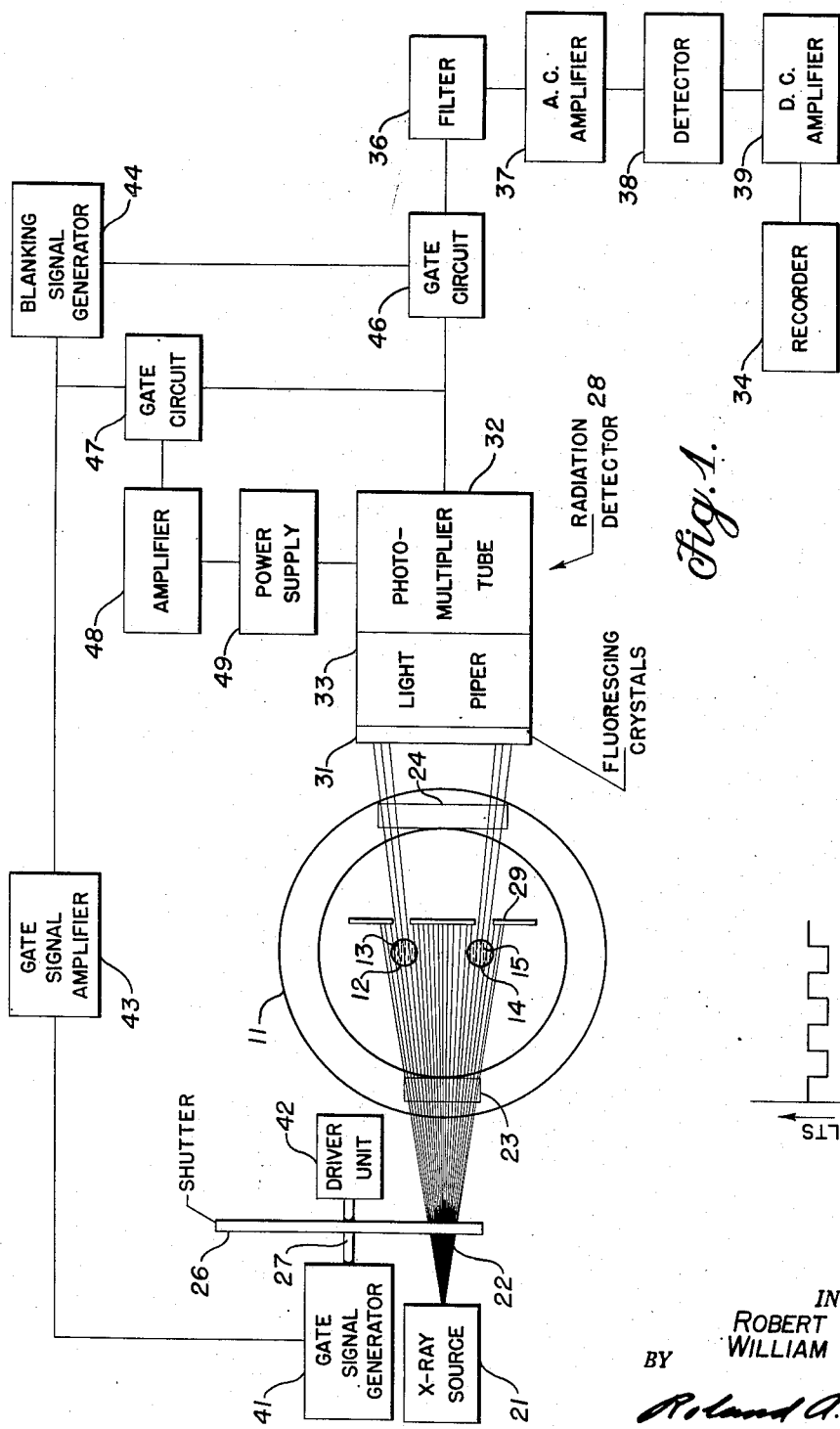

2,659,012

UNITED STATES PATENT OFFICE 2,659,012

X-RAY DENSITOMETER

Robert Bromberg and William L. Martin, Los Angeles, Calif., assignors to the United States of America as represented by the United States Atomic Energy Commission Application August 7, 1951, Serial No. 240,695

2 Claims. (Cl. 250—71)

The present invention relates to an improved method and means for density measurement and in more particular to method and means for comparative density measurements having substantially no effect on or physical contact with the material under test.

While innumerable different methods have been developed and perfected for determining density, the majority require physical contact with the material to be measured or operate to produce an interference of one kind or another with the material so that the material is in fact affected in some manner. While these characteristics are of no importance in many instances, they do in certain applications materially limit the applicability of the method or even preclude its use.

Further viewing the prior art, it is noted that in general rapid variations in density are not measurable by conventional apparatus and in fact average density readings are commonly desired; however, in the instance of high velocity fluid flow and the like, the determination of instantaneous density at a fixed point with respect to said flow is often of importance.

The present invention is adapted not only to measure transient density fluctuations of high, as well as low, frequency, but also operates substantially without effect upon the material under test. This is accomplished by the fulfillment of the following objects and in the manner set forth below.

It is an object of the present invention to provide an improved method and means of measuring density.

It is another object of the present invention to provide an improved method and means of measuring the density of a fluid moving at a high rate of flow.

It is another object of the present invention to provide an improved method and means of measuring transient density fluctuations having high or low frequency components.

It is still another object of the present invention to provide an improved method and means of measuring transient density fluctuations with a resolution of the order of ±0.01 gram per cubic centimeter.

It is a further object of the present invention to provide an improved method and means for accurately comparing the densities of two fluids or one fluid and a solid.

It is a still further object of the invention to provide an improved method and means for density determinations by X-ray absorption.

Numerous other possible objects and advantages of the invention will be apparent from the following description and accompanying drawings, wherein:

Figure 1 is a schematic representation of a device embodying the principles of the present invention and operating in conjunction with associated apparatus; and Fig. 2 is an idealized voltage-time relationship of the signal from the radiation detector of Fig. 1.

Considering now the components and connections of an embodiment of the invention it is noted that the embodiment is illustrated as operating upon fluid flow in apparatus for testing other fluid flow characteristics. There is provided a pressure vessel 11 having internal thereto a thin-walled tube 12 through which water or other fluid 13 is passed at high pressures and temperatures and by which other flow measurements not connected with the present invention may be obtained. For the purpose of this invention a second thin-walled tube 14, identical to tube 12, is disposed internal to vessel 11 and adjacent tube 12. Interior to tube 14 there is provided water or other fluid 15 in a stationary state and at a known pressure and temperature whereby the absolute density thereof may be accurately determined. It is again emphasized that the above-described apparatus does not form a necessary part of the present invention and is only illustrated as an example of apparatus with which the present invention may be associated, it only being necessary to provide adjacent the material to be tested a standard sample upon which absolute density measurements may be based.

The present invention contemplates the measurement of the comparative absorption of particles or waves passed through a test sample and standard sample as an indication of the relative densities thereof. In the illustrated embodiment the density of water is to be measured and in the test apparatus illustrated tubes formed of stainless steel or the like are employed to conduct the fluid flow. It was determined from a study of the absorption characteristics of these materials that radiation in the range of wave lengths including X-rays and gamma rays is most feasible and of these two there is illustrated X-ray irradiation. A suitable X-ray beam may be obtained from a conventional X-ray source 21 producing a beam 22 which is made substantially monochromatic either at its origin or by suitable filtering.

The passage of X-rays through pressure vessel 11 is facilitated by the provisions of windows 23 and 24 located in the wall of vessel 11 and disposed on either side of tubes 12 and 14 and formed of aluminum or other substance relatively transparent to X-rays. Alternate irradiation of tubes 12 and 14 is obtained by the provision of a shutter mechanism disposed in the path of X-ray beam 22 intermediate X-ray source 21 and tubes 12 and 14, preferably exterior to vessel 11. This mechanism may take the form of a chopper wheel 26 having suitably disposed apertures therein and rotating at a fixed speed upon a shaft 27.

The X-ray beam passing through tubes 12 and 14 is detected by radiation detector 28 disposed on the opposite side of tubes 12 and 14 from X-ray source 21 and an apertured shield 29 limits the detected X-rays to a portion of the beam passing through tubes 12 and 14. Shield 29 which may be disposed either in front or behind tubes 12 and 14 relative to X-ray beam 22, has two apertures therein, one adjacent each tube. Shield 29 is formed of a material that is opaque to X-rays and thus collimates X-ray beam 22 into two small beams which pass one through test tube 12 and one through standard tube 14.

Radiation detector 28 consists in part of fluorescing crystals 31 disposed in the path of the X-ray beams that have passed through tubes 12 and 14. The crystal assembly is formed of crystals which emit light in proportion to the amount of X-ray energy passing through tubes 12 and 14 and may be formed of cadmium-tungstate crystals. In view of the difficulty of obtaining a single crystal of sufficient size, a matrix may be formed by bonding together a plurality of rectangular crystal sections. The light from crystals 31 is directed into a photomultiplier tube 32 either by mounting crystals 31 directly thereon or through the medium of a total reflection light piper 33, as shown. The provision of a light piper is advantageous where it is desired to place the crystals at a distance from photomultiplier tube 32, as for example interior to vessel 11, wherein light piper 33 would extend through the wall of vessel 11.

The electrical signals from photomultiplier tube 32 are employed to operate a recorder 34 which may be a brush oscillograph and in connection therewith there is provided a band-pass filter 36, an alternating current amplifier 37, a detector 38, and a direct current amplifier 39 through which the signal passes from photomultiplier tube 32 to recorder 34.

The output of radiation detector 28 includes certain signals not useful in measuring density fluctuations and resulting from the transient time of the slots in chopper wheel 26. This undesirable signal has a frequency component comparable to that of the density fluctuations, as is noted below in more detail, and thus, it is necessary to remove or cancel this signal in order that the desired signal will not be masked. This is accomplished electronically by the provision of a gate signal generator 41 in combination with a driver unit 42 which rotates chopper wheel 26. Gate signal generator 41 provides a signal in synchronism with the motion of chopper wheel 26 and this signal is amplified by gate signal amplifier 43 and applied to blanking signal generator 44 which in turn produces a signal proportional thereto which is applied to a gate circuit 46 connected between photomultiplier tube 32 and band-pass filter 36. This circuit electronically blanks out undesirable components in the photomultiplier output, as is explained in more detail below.

In addition to the above-noted corrective circuit there is also provided a regulator circuit which compensates for slow variations in characteristics of the apparatus, as for example drift in X-ray intensity, crystal fatigue, and changes in photomultiplier tube characteristics which, if uncorrected, would introduce errors in the measurements. Regulation is accomplished by controlling the gain of photomultiplier tube 32. There is provided a gate circuit 47 which has its input connected to gate signal amplifier 43 and to photomultiplier tube 32 and which produces a signal proportional to the difference therebetween and which signal is amplified by amplifier 48 and applied to the regulator tube in power supply 49 that supplies the dynode voltage for photomultiplier tube 32. By this means the gain of tube 32 is controlled in accordance with slow variations in the output thereof to compensate for such variations.

The foregoing has described the elements of an illustrative embodiment of the invention, and there will now be considered the operation of this embodiment. With water 13 flowing through test tube 12 and standard tube 14 adjacent thereto filled with stationary water 15 at known temperature and pressure whereby the density thereof may be accurately determined, X-ray source 21 is energized to produce a substantially monochromatic X-ray beam directed upon pressure vessel 11 about tubes 12 and 14. X-ray beam 22 enters vessel 11 by means of window 23 and leaves by window 24 in alignment therewith; however, the emergent X-rays are collimated by shield 29 which intercepts all of the X-rays except those passing through a predetermined portion of tube 12 or 14 as determined by the disposition and configuration of the apertures in shield 29. There thus emerges from vessel 11 two separate X-ray beams of which one has passed through test tube 12 and one through standard tube 14. Shutter mechanism in the form of chopper wheel 26 alternately interrupts portions of the X-ray beam 22 from source 21 so that X-rays pass through tubes 12 and 14 alternately and the X-ray beams emerging from vessel 11 alternate in time. X-ray absorption in tubes 12 and 14 is a function of the density of the water therein and thus, as tubes 12 and 14 are identical, the relative intensities of the X-ray beams emerging from vessel 11 are proportional to the relative densities of the stationary water 15 in standard tube 14 and flowing water 13 in test tube 12.

The intensity of emergent X-ray beams is measured by radiation detector 28 wherein fluorescing crystals 31, having the emergent X-ray beams impinging thereon, produce light signals proportional to the intensity of the impinging X-rays and a light piper 33 transmits these light signals undiminished to photomultiplier tube 32 wherein proportional electrical signals are produced. It will be appreciated that the photomultiplier tube output signal is pulsating direct current with the pulsations being approximately rectangular in shape and the peak to peak amplitude thereof being proportional to difference of X-ray absorption in the two X-ray paths. As the absorption or transmissivity of the paths is a function of density of the water in the tubes 12 and 14 the photomultiplier tube output signal changes with varying density of water in test tube 12 in that the amplitude of pulsations in the signal will be modified in accordance with the density change. The output signal of photomultiplier tube 32 is filtered in a band-pass filter 36 whose band width is determined by the fidelity requirements of the particular apparatus and which serves to cut out a large proportion of so-called "noise signals" which have different frequencies and are inherent to any system such as that illustrated; and which for example might include signal fluctuations produced by X-ray beam variations caused by a small ripple voltage in the X-ray supply. The signal from filter 36 is amplified by amplifier 37 and fed into detector 38 which may include a phase inverter and which preferably has a small time constant in order not to impair high frequency response of the system. A further amplifier 39 may be provided to strengthen the signal sufficiently to drive a recorder 34 to which it is applied and such amplifier is best compensated and is most advantageous when employed with a brush oscillograph recorder as the response thereof rapidly decreases with higher frequencies, say about thirty cycles per second. Recorder 34 may, of course, be any type of indicating instrument suitable for the particular measurements to be made and in this respect it is noted that the particular electronic circuit described above is in no way limiting and that various circuits or combinations of elements may be employed consistent with the requirements of any particular application.

As noted above, the output signal from photomultiplier tube 32 is a pulsating direct current signal with approximately square wave pulsations, as shown in Fig. 2. Actually the signal includes sharp peaks produced by the chopper wheel action which are practically unavoidable because of mechanical limitations of the chopper wheel. In order to prevent these peaks from reaching the indicating system, there is provided a gate circuit 46, intermediate photomultiplier tube 32, and filter 36. Gate circuit 46 adds to the signal from photomultiplier tube 32 a further signal which may be denominated as a blanking signal and which cancels out certain undesirable portions of the tube signal whereby the signal applied to filter 36 is a substantially square wave. This blanking signal is derived from the chopper wheel 26 by gate signal generator 41 which might, for example, comprise a light source and photocell. The signal from gate signal generator 41 may be amplified, as by gate signal amplifier 43, and fed into blanking signal generator 44 which produces a signal in synchronism therewith that is applied to control gate circuit 46. By this means compensation is provided for undesirable frequency components in the photomultiplier tube output.

The drift compensating regulator system noted above is controlled in part by the amplified signal from gate signal generator 41 which is applied to gate circuit 47. Also applied to an input circuit of gate circuit 47 is a portion of the photomultiplier tube output signal. As the signal from gate signal generator 41 depends upon the angular position of chopper wheel 26, it is employed to control the gating action of gate circuit 47 so that this circuit passes only the portion of photomultiplier tube output that is derived from the X-rays passing through standard tube 14. This portion of photomultiplier tube output is applied by gate circuit 47 to regulator amplifier 48 which provides an output dependent upon the difference between the input signal and a constant voltage. This regulator amplifier output is applied to control power supply 49 which energizes the dynodes of photomultiplier tube 32. By this means the sensitivity of photomultiplier tube 32 is controlled or regulated to maintain constant the photomultiplier tube signal produced by X-rays passing through standard tube 14 and thus to electronically compensate for slow variations as result from drifts in X-ray intensity, crystal fatigue, and changes in photomultiplier tube characteristics. It is also noted with regard to the above-described regulator that the illustrated circuit therefor is not exclusive and numerous variations thereof are possible, as for example, regulation of the X-ray source to reduce errors from drift in the output thereof.

It will be seen from the foregoing that the present invention provides a new and improved method of measuring density, and in particular, transient density fluctuations. A typical device constructed in accordance with the present invention measures density fluctuation frequency components from 0 to 100 cycles per second and with a resolution of ±0.01 gram per cubic centimeter. It is noted that X-ray absorption is an exponential function; however, only about 10% of the X-rays passing through the tubes 12 and 14 are absorbed and thus the absorption effect lies within the first 10% of an exponential curve and therefore a substantially linear relationship is obtained. While the use of a linear relationship is highly desirable it is necessary in the present instance to measure the X-ray beam with ten times the desired accuracy of density measurement as only about 10% of the X-rays are absorbed. This is accomplished by operating the photomultiplier input at a high level which reduces the proportionate effect of the dark current noise and by measuring only density differences. By employing A. C. amplifier 37 and filter 36 only the variations in signal are passed on to recorder 34, and noise of other frequencies and the direct current base are excluded. Thus, at recorder 34 there is indicated the relative densities of flowing water 13 and stationary water 15, and absolute density measurements of flowing water 13 are determined from the application of this ratio to the known and constant density of stationary water 15 in standard tube 14.

The present invention has been disclosed with respect to but a single preferred embodiment; however, it will be apparent to those skilled in the art that numerous variations and modifications are possible within the spirit and scope of the invention and thus the invention is not to be limited except as defined in the following claims.

What is claimed is:

1. An improved comparative densitometer for indicating the standard relative density of a pair of objects and comprising an X-ray source emitting a substantially mono-energetic beam of X-rays directed upon said objects, an interrupter disposed intermediate said source and said objects and alternatively shielding each of said objects from said source, a radiation detector disposed on the opposite side of said objects from said source and in alignment therewith, said radiation detector having controlled amplification means and an output, a first gate circuit having an input and an output with the input thereof connected to the output of said radiation detector, indicating means connected to the output of said gate circuit, a gate signal generator energized by said interrupter to produce signals in synchronism with the alternating X-ray beam striking one of said objects, a blanking signal generator connected to and controlled by said gate signal generator and producing a blanking signal, said first gate circuit having control means energized by said blanking signal to protect said indicating device from undesirable signals of said radiation detector, power supply means including a standard voltage source and having a variable voltage output applied to the control means of said radiation detector, and a second gate circuit having an input connected to the output of said radiation detector and an output connected to said power supply means, said second gate circuit having a gate control connected to said gate signal generator whereby said radiation detector is controlled to produce at the output thereof a signal of constant amplitude for incident X-rays transmitted through one of said objects.

2. A comparative densitometer for indicating the instantaneous relative densities of a pair of objects comprising in combination an X-ray source producing an X-ray beam of substantially monochromatic energy directed upon said objects, a radiation detector disposed on the opposite side of said objects from said X-ray source and including fluorescing crystals having the X-rays transmitted through said objects impinging thereon and a photomultiplier tube adjacent said crystals for producing electrical signals proportional to the intensity of X-rays impinging upon said crystals, shutter mechanism intermediate said X-ray source and said objects and alternately shielding each of said objects whereby said objects are alternately irradiated, a power supply having control means and energizing said photomultiplier tube to operate at high level output, a gate circuit having control means and an input and output circuit, said input circuit being connected to the output of said photomultiplier tube, a gate signal generator connected to said shutter mechanism and producing a gate signal in synchronism therewith, means impressing said gate signal upon the control means of said gate circuit to render said gate circuit conducting during the periods said shutter mechanism is passing X-rays toward a predetermined one of said objects, a regulator-amplifier connected to the output of said gate circuit and receiving electrical signals from said photomultiplier tube produced by X-rays passing through the predetermined one of said objects, said regulator-amplifier having a standard voltage source and comparing the received signals thereto to produce a difference voltage, means impressing said difference voltage upon the control means of said photomultiplier tube power supply whereby the photomultiplier tube output signals produced by X-rays passing through the predetermined one of said objects is regulated, a band pass filter filtering the output of said photomultiplier tube and passing only signals of the same frequency as the alternation of said X-ray beam, an alternating current amplifier connected to said band pass filter, and indicating means connected to said amplifier and indicating the signals passed therethrough as a measure of the relative X-ray transmissivity of said objects and thus of the density thereof.

ROBERT BROMBERG.
WILLIAM L. MARTIN.

References Cited in the file of this patent

UNITED STATES PATENTS

| Number | Name | Date |
| --- | --- | --- |
| 2,488,269 | Clapp | Nov. 15, 1949 |
| 2,539,203 | Pohl | Jan. 23, 1951 |
| 2,583,132 | Altar et al. | Jan. 22, 1952 |

OTHER REFERENCES

X-Ray Photometer, Michel et al., General Electric Review, February 1947, pages 45–48.

X-Ray Thickness Gauge for Cold-Rolled Strip Steel, Lundahl, A. I. E. E. Transactions, 1948, vol. 67, pages 83–90.